United States Patent Office 3,554,935
Patented Jan. 12, 1971

3,554,935
POLYIMIDE FOAMS
Edmund C. Knapp and Albert H. Markhart, Wilbraham, and Irving Serlin, Springfield, Mass., assignors to Monsanto Company, St. Louis, Mo., a corporation of Delaware
No Drawing. Filed Mar. 12, 1968, Ser. No. 712,347
Int. Cl. C08f 47/10; C08j 1/26
U.S. Cl. 260—2.5                                21 Claims

ABSTRACT OF THE DISCLOSURE

Disclosed herein are polyimide foams prepared from a mixture of (1) an A-staged polyimide resin forming composition having a volatile content of at least 9% by weight, and
(2) a B-staged polyimide resin having a volatile content of less than 9% by weight.

The mixture is heated to at least that temperature where foaming occurs contemporaneously with the polymerization of the A-staged system, to form a polyimide foam having a density up to 70 lbs./cu. ft.

BACKGROUND OF THE INVENTION

(1) Field of the invention

The present invention relates to polyimide foams. More particularly, the present invention relates to polyimide foams which are prepared from (1) an A-staged polyimide resin forming composition having a volatile content of at least 9% by weight, and
(2) a B-staged polyimide composition having a volatile content of less than 9% by weight.

The polyimide foam is prepared by first preparing a mixture of A-staged and B-staged systems and then heating this mixture to that temperature where foaming of the A-stage occurs contemporaneously with polymerization.

(2) Description of the prior art

Processes for preparing polyimide foams are described in U.S. Pats. 3,249,561 (W. R. Hendrix) and 3,310,506 (Amborski et al.). These references describe methods for the production of polyimide foams prepared from a polyamide acid solution which involves:

(1) selecting a polyamide acid solution with a critical viscosity,
(2) introducing bubbles into the polyamide acid solution,
(3) shaping the mass, and
(4) converting the polyamide acid to a polyimide.

Hendrix brings about the conversion of polyamide acid to polyimide using chemical means such as the addition of acid anhydrides and acids such as formic or oxalic to the polyamide acid solution.

Amborski et al. brings about the conversion of polyamide acid to polyimide using heat. Both patentees state that according to their procedures polyimide foams having a density of from 0.01 g./cc. to 0.5 g./cc. (0.62 to 31.22 lbs./cu. ft.) are obtained.

Patent application Ser No. 568,129, filed July 27, 1966, now abandoned, teaches a method for preparing low density polyimide foams, i.e. foams having densities of less than 10 lbs./cu. ft., by the direct reaction of a tetracarboxylic ester and a polyamine component. This method provides a process for the preparation of low density polyimide foams which avoids the necessity of first preparing a polyamide acid solution having a certain critical viscosity, introducing bubbles therein and then converting the polyamide acid to a polyimide.

However, a definite need still exists in the art for a process for preparing high density polyimide foams, i.e. foams having densities in the range of from 10 to 70 lbs./cu. ft. without the necessity of first preparing a polyamide acid solution with a certain critical viscosity, introducing bubbles into the solution and then converting this mass into a polyimide resin using either heat or chemical means.

A further need exists in the art for low density polyimide foams having densities of from 4.0 to less than 10 lbs./cu. ft. with improved physical properties such as improved compressive strength, improved resiliency, etc.

A further need exists in the art for polyimide foams having a density of greater than 32 lbs./cu. ft.

SUMMARY OF THE INVENTION

The present invention relates to polyimide foams. More particularly the present invention relates to high density polyimide foams, i.e. foams having densities in the 10 to 70 lbs./cu. ft. range and to polyimide foams having densities in the 4.0 to less than 10 lbs./cu. ft. range, with improved physical properties such as improved compressive strength, improved resiliency, etc.

The polyimide foams of the present invention are prepared by first preparing an intimate mixture comprising:

(1) an A-staged polyimide resin forming composition having a volatile content of at least 9%, and
(2) a B-staged polyimide resin having a volatile content of less than 9%.

and then heating this mixture to at least the polymerization reaction temperature of the A-staged material where foaming of the A-staged material occurs contemporaneously with polymerization.

The present invention solves the aforementioned problems previously existent in the prior art by providing a process for the preparation of high density polyimide foams, i.e. foams having a density over 10 lbs./cu. ft. which avoids the necessity of first preparing a polyamide acid solution, introducing bubbles into the solution and then converting the polyamide acid to a polyimide using heat or chemical means.

The present invention solves another problem by providing low density polyimide foams, i.e. foams having densities in the range of from 4 to less than 10 lbs./cu. ft., with improved physical properties such as improved compressive strength, improved resiliency, etc.

The present invention solves still another problem by providing polyimide foams having densities greater than 32 lbs./cu. ft.

It is therefore an object of this invention to provide high density polyimide foams having densities in the range of from 10 to 70 lbs./cu. ft.

It is another object of this invention to provide polyimide foams having densities in the range of from 4 to less than 10 lbs./cu. ft. with improved physical properties.

It is another object of this invention to provide polyimide foams with densities greater than 32 lbs./cu. ft.

It is another object of this invention to provide a process for the preparation of the aforementioned polyimide foams.

The foregoing and other objects are obtained by heating a mixture comprising:

(A) from 5 to 95 parts by weight based on the total resin weight of the system of an A-staged polyimide resin forming composition having a volatile content of at least 9% by weight, and
(B) from 95 to 5 parts by weight based on the total resin weight of the system of a B-staged polyimide resin having a volatile content of less than 9%.

DESCRIPTION OF THE PREFERRED EMBODIMENTS

The polyimide forming components of the A-staged compositions and the polyimide materials of the B-staged material which are used in the invention are well known to those skilled in the art. In general, the polyimide resin forming compositions of the A-staged material comprise an intimate mixture of (1) a tetracarboxylic component selected from the group consisting of esters of tetracarboxylic acids, ammonium salts of tetracarboxylic acids and mixtures thereof; and
(2) a polyamine component having at least two primary amino groups per molecule.

The suitable derivatives of the free tetracarboxylic acids include partial and full ester derivatives wherein the alcohol moiety of the ester is an aliphatic alcohol, aromatic alcohol, an amino alcohol, a polyol such as glycol and other related compounds; and partial and full ammonium salts and substituted ammonium salts of the tetracarboxylic acid component wherein the ammonium salt is prepared using ammonia or substituted ammonia such as primary, secondary and tertiary amines and mixtures of the foregoing.

The tetracarboxylic ester derivatives which are used in the present invention are represented by the following formula:

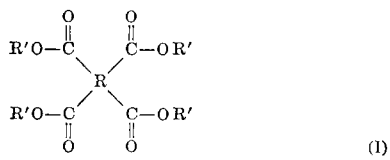

(1)

wherein R is a tetravalent organic radical selected from the group consisting of aromatic carbocyclic; aromatic heterocyclic; combination of aromatic carbocyclic and aliphatic; combinations of aromatic heterocyclic and aliphatic; combinations of aromatic carbocyclic, aromatic heterocyclic and aliphatic; and substituted groups of the foregoing. However, the preferred tetravalent radicals are aromatic radicals in which the R groups have at least one ring of 6 carbon atoms characterized by benzenoid unsaturation (alternate double bonds in a ring structure), and particularly those aromatic tetravalent radicals wherein the four carboxylic groups are each attached to separate carbon atoms in a benzene ring and wherein the carbon atoms of each pair of carboxylic groups is directly attached to adjacent carbon atoms in a benzene ring of the R group, and wherein R' is selected from the group consisting of hydrogen, alkyl radicals of from 1 to 12 carbon atoms, oxyalkyl radicals of from 2 to 10 carbon atoms, hydroxyalkyls and hydroxy(oxy)alkyls, wherein the alkyl radicals contain from 2 to 10 carbon atoms; aryl radicals of from 6 to 16 carbon atoms; and N,N dialkyl amino alkyl radicals of the following general formula:

(II)

wherein R'' is an alkyl radical of from 1 to 5 carbon atoms and $n$ is an integer of from 2 to 6; provided that no more than three (3) R' groups in Formula I are hydrogen.

Illustrations of tetracarboxylic dianhydrides which are used to prepare the tetracarboxylic component reactants of the present invention include: 2,2'-3,3'-benzophenone tetracarboxylic dianhydride, 3,4,3',4'-benzophenone tetracarboxylic dianhydride, pyromellitic dianhydride, 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl)propane dianhydride; bis(3,4-dicarboxyphenyl)sulfone dianhydride; 3,4,-9,10-perylene tetracarboxylic dianhydride; bis(3,4,-dicarboxyphenyl)ether dianhydride; ethylene tetracarboxylic dianhydride; naphthalene-1,2,4,5-tetracarboxylic dianhydride; naphthalene-1,4,5,8-tetracarboxylic dianhydride; decahydronaphthalene-1,4,5,8-tetracarboxylic dianhydride; 4,8-dimethyl-1,2,3,5,6,7 - hexahydronaphthalene - 1,2,5,6-tetracarboxylic dianhydride; 2,6 - dichloronaphthalene-1,4,5,8-tetracarboxylic dianhydride; 2,7-dichloronaphthalene - 1,4,5,8 - tetracarboxylic dianhydride; 2,3,6,7 - tetrachloronaphthalene - 1,4,5,8 - tetracarboxylic dianhydride; phenanthrene-1,8,9,10-tetracarboxylic dianhydride; cyclopentane-1,2,3,4-tetracarboxylic dianhydride; pyrrolidine-2,3,4,5-tetracarboxylic dianhydride; pyrazine-2,3,5,6-tetracarboxylic dianhydride; 2,2 - bis - (2,3-dicarboxyphenyl) propane dianhydride; 1,1-bis(2,3-dicarboxyphenyl)ethane dianhydride; 1,1-bis(3,4-dicarboxyphenyl)ethane dianhydride; bis(2,3-dicarboxyphenyl)methane dianhydride; bis-(3,4-dicarboxyphenyl)methane dianhydride; bis(3,4-dicarboxyphenyl)sulfone dianhydride; benzene-1,2,3,4-tetracarboxylic dianhydride, 1,2,3,4-butane tetracarboxylic dianhydride; thiophene - 2,3,4,5 - tetracarboxylic dianhydride; etc.

Other suitable tetracarboxylic dianhydrides may be prepared by linking two moles of trimellitic dianhydride through their free acid group as described in detail in U.S. Pats. 3,182,073 and 3,347,808. These dianhydrides are then converted to the partial or full ester derivatives through conventional methods. The free acids of the foregoing dianhydrides can then be used to prepare the ammonium salt derivatives using conventional methods.

The free tetracarboxylic acids used may be prepared by reacting the corresponding dianhydrides with water or other methods well known to those skilled in the art. In a similar fashion the preparation of the ammonium salt derivatives of the tetracarboxylic acids is well known to those skilled in the art.

The ester derivatives of the foregoing tetracarboxylic acids are readily prepared by reacting the corresponding dianhydride with an alcohol such as ethanol. By controlling the reaction conditions one may prepare partial or full ester derivatives of the type described above in reference to Formula I. Examples of other suitable alcohols in addition to ethanol mentioned above include methanol, propanol, butanol, pentanol, hexanol, heptanol, octanol, ethylene glycol, diethylene glycol, tri-ethylene glycol, 1,3-propane diol, 1,2-propane diol; 2-(dimethylamino)ethanol, 3-(dimethylamino)propanol; 3-(N-ethyl-N-methyl amino) propanol, etc.

The tetracarboxylic acid esters used in the practice of this invention are available commercially or can be readily prepared by one skilled in the art according to the procedures set forth in U.S. Pat. 3,347,808 or standard reference texts such as Heilbron and Bunbury, "Dictionary of Organic Compounds," Eyre and Spottiswood, London (1953), as well as other references which are well known to those skilled in the art.

The ammonium salt derivatives of the tetracarboxylic acids, which are reacted with the polyamine components to produce the polymeric compositions used in the present invention, are prepared by reacting a tetracarboxylic acid of the type represented by Formula I above wherein R' is hydrogen, with ammonia and/or its substituted derivatives.

Also included in the concept of the present invention are mixed esters and ammonium salts such as the di-ester-diammonium salt derivatives of tetracarboxylic acids, and ammonium salts-amides such as the diammonium salt-diamide of tetracarboxylic acids.

The substituted derivatives of ammonia used in the present invention include those of the following general formula:

(III)

which are prepared by replacing the hydrogen atoms on the ammonia molecule with radicals selected from the group consisting of alkyl, aryl or cycloalkyl.

$R_x$, $R_y$ and $R_z$ in the foregoing Formula III are selected from the group consisting of hydrogen, alkyl radicals of from 1 to 8 carbon atoms, cycloalkyl radicals of from 5 to 8 carbon atoms and aryl radicals of from 6 to 16 carbon atoms.

In the preferred substituted ammonia derivatives $R_x$, $R_y$ and $R_z$ are alkyl of from 2 to 8 carbon atoms, cycloalkyl of from 5 to 8 carbon atoms, and aryl of from 6 to 10 carbon atoms.

Examples of compounds that are reacted with the tetracarboxylic acid components to form the tetracarboxylic acid substituted ammonium salt derivatives which are used in the practice of this invention include ammonia and its substituted derivatives. These derivatives of ammonia include monomethylamine, diethylamine, trimethylamine, triethylamine, tripropylamine, tri-n-butylamine, tri-iso-pentylamine, tripentylamine, tri-n-hexylamine, tri-n-heptyl amine, N-methyl diethylamine, N,N-dimethylbenzylamine, N-ethyldibenzylamine, triphenyl amine, dimethylaniline, diethylaniline, triethylene diamine, etc. Other compounds which may be used to form salts with the tetracarboxylic compounds include pyridine type compounds such as halo-pyridines such as 2-chloropyridine, etc.; alkyl substituted pyridines wherein the alkyl groups contain from 1 to 4 carbon atoms such as methyl pyridine, s-2,4,6-trimethyl pyridine, 2-ethyl pyridine, 4-ethyl pyridine, pyridines such as pyridine-1-sulfide and their alkyl derivatives wherein the alkyl groups contain from 1 to 4 carbon atoms; aromatic pyridines such as 2,2′-bipyridine, 4-benzylpyridine, etc.; other heterocyclic nitrogen compounds would include quinoline, pyrimidine and its alkyl derivatives wherein the alkyl group contains from 1 to 4 carbon atoms; pyrazine, 2-methyl pyrazine, 2-ethyl pyrazine, etc. Also suitable are quinaldines, acridines, isoquinolines, quinoxalines, s-pyridiazines, s-triazine and other triazines, cinnolines, quinazolines and their alkyl derivatives wherein the alkyl group contains from 1 to 4 carbon atoms, tetramethylguanidine, etc. Also contemplated is the use of alkanol amines such as 3-diethylamino-1-propanol, etc. The preferred substituted ammonia derivatives are the tertiary amines.

The expression "ammonium salts" is used herein to include those salts prepared using the derivatives of ammonia set forth above, and the pyridine derivatives.

The preferred tetracarboxylic components are the ester derivatives with the dialkyl and dihydroxyalkyl derivatives being especially preferred. In the more preferred embodiment the alkyl group of the diester contains from 1 to 4 carbon atoms and in the most preferred embodiments, the tetracarboxylic component is the diethyl ester of benzophenone tetracarboxylic acid or ethylene glycol diester of benzophenone tetracarboxylic acid.

The polyamines used in the A-staged composition in the practice of the present invention include diamines characterized by the formula $H_2N-R_1-NH_2$ wherein $R_1$ is a divalent radical containing at least two carbon atoms selected form the following groups: aromatic, aliphatic, cycloaliphatic, combination of aromatic and aliphatic, heterocyclic and bridged aromatic radicals wherein the bridging group is a divalent radical selected from the group consisting of alkylene of from 1 to 6 carbon atoms, oxygen, arylene of from 6 to 16 carbon atoms, —NH—, sulfur, sulfonyl, carbonyl, phosphorous, phosphonyl, silicon and derivatives thereof. The preferred $R_1$ groups in the diamines are the aromatic amines containing at least one ring of 6 carbon atoms, characterized by benzenoid unsaturation. Such $R_1$ groups include para-phenylene, meta-phenylene, bisphenyl radicals, fused ring systems having 2 to 4 aromatic nuclei wherein the two amine groups would be located on separate aromatic nuclei and bridged organic radicals of the general formula:

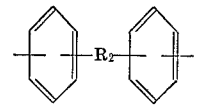

(IV)

wherein $R_2$ is a divalent radical selected from the group consisting of an alkylene radical of from 1 to 6 carbon atoms, arylene radicals of from 6 to 16 carbon atoms, oxygen, —NH—, carbonyl, sulfonyl, phosphonyl and silyl radicals wherein the substituent groups on the silyl radical are aryl and those structures wherein the $R_2$ group is a divalent linking moiety joining the aromatic nuclei by ester, amide and thioester linkages.

Among the diamines which are suitable for use in the present invention are:

meta-phenylene diamine;
para-phenylene diamine;
4,4′-diamino-diphenyl propane;
4,4′-diamino-diphenyl methane;
benzidine;
4,4′-diamino-diphenyl sulfide;
4,4′-diamino-diphenyl sulfone;
3,3′-diamino-diphenyl sulfone;
4,4′-diamino-diphenyl ether;
2,6-diamino-pyridine;
bis-(4-amino-phenyl)diethyl silane;
bis(4-amino-phenyl)diphenyl silane;
bis-(4-amino-phenyl)-N-methyl amine;
1,5-diamino naphthalene;
3,3′-dimethyl-4-4′-diamino-diphenyl;
3,3′-dimethoxy benzidine;
2,4-bis(beta-amino-t-butyl)toluene;
bis-(para-beta-amino-t-butylphenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl-) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy)ethane;
2,2-dimethyl propylene diamine;
3-methoxy-hexamethylene diamine;
2,5-dimethyl-hexamethylene diamine;
2,5-dimethyl-heptamethylene diamine;
5-methylnonamethylene diamine;
1,4-diamino-cyclohexane;
1,12-diamino-octadecane;
2,5-diamino-1,3,4-oxadiazole;
$H_2N(CH_2)_2O(CH_2)_3NH_2$;
$H_2N(CH_2)_3S(CH_2)_3NH_2$;
$H_2N(CH_2)_3N(CH_3)(CH_2)_3NH_2$;
3,3′-dichloro-benzidine;
bis-(4-amino-phenyl)ethyl phosphine oxide;
bis-(4-amino-phenyl)phenyl phosphine oxide;
bis-(4-amino-phenyl)N-phenylamine;
p-phenylene-bis-2-(amino-1,3-benzoxazole);
2,5-bis(p-amino phenyl)1,3,4-oxadiazole;
m-phenylene-bis-(m-aminobenzamide);
3,4′-diamino benzanilide
and mixtures of the foregoing.

Other polyamines which contain from 3 to 6 amine groups per molecule may also be used. Examples of such suitable polyamines include melamine; tris(4-aminophenyl)methylcarbinol; 3-methyl - 4,6,4' - triamino-diphenylmethane; 1,2,4-benzenetriamine; 1,3,5-triaminobenzene; 2,4,4'-bis-phenyltriamine; the various triaminodiphenyl ethers; tetraaminodiphenyl ethers; hexaaminodiphenyl ethers; etc., the various triaminodiphenyl sulfides; tetraaminodiphenyl sulfides, pentaaminodiphenyl sulfides, etc., 3,3'-diamino-benzidine; bis(3-methyl-4,6-diaminophenyl)-methane; and various tri, tetra, penta and hexaminodiphenyl compounds wherein the two phenyl groups are bridged by an alkylene of from 1 to 6 carbon atoms, arylene of from 6 to 16 carbon atoms, oxygen, —NH—, carbonyl, sulfur, sulfonyl, phosphorous, phosphonyl and silyl radicals.

The preferred polyamines for use in this invention are the diamines, melamine and mixtures thereof. Especially preferred are the diamines set forth above wherein $R_1$ is an aromatic group containing at least one ring of 6 carbon atoms characterized by benzoid unsaturation.

The proportion of reactants used in the A-staged composition can be varied over a wide range, for example, one can use about 70% molar excess of the polyamine to about a 10% molar excess of the tetracarboxylic compound. Preferably one would use up to a 20% molar excess of the polyamine to about a 5% molar excess of the tetracarboxylic compound. More preferably, one would use equimolar amounts of the respective components.

In general the percent volatile content of the A-staged composition due to the evolution of the alcohol or ammonia and derivatives thereof and the water of condensation should be at least 9% when using the partial ester or ammonium salt derivatives of tetracarboxylic acids and at least 16% when using the full ester or ammonium salt derivatives. Preferably, one would use A-staged compositions based on tetracarboxylic esters where the volatile content due to evolution of the alcohol moiety of the ester and the water of condensaion is at least 14% when using the partial ester derivatives of tetracarboxylic acids and at least 22% when using the full ester derivatives.

When using the preferred dialkyl and dihydroxyalkyl esters of tetracarboxylic acids and the preferred diamines the lower limit percent volatiles content of the system is preferably at least 14% and more preferably 18%.

The upper limit of the volatile content is less critical than the lower limit as is evidenced by the working examples, and will vary widely with the particular system used. In general, the upper limit should not exceed 97% volatiles and preferably, it should not exceed 75%. More preferably, the upper limit of the volatile content should not exceed 55%.

As stated above, the A-staged composition is an intimate mixture of a teracarboxylic component and a polyamine component. This intimate mixture is conveniently prepared by evaporating a solution of the reactants to dryness using low temperatures, i.e. less than 100° C. and reduced pressures. The dried product can then be broken up and sieved if necessary to achieve a given particle size.

Alternately, one may use a concentrated solution of the reactants as the A-staged composition. In a third method one may prepare an intimate mixture of the tetracarboxylic and ployamine components by grinding the respective reactants in the presence of each other. This may be carried out in a ball mill, crusher, disintegrator, grinder or other similar apparatus.

Useful solvents with which to prepare the A-staged solutions discussed above include organic liquids such as dioxane; the lower alkyl alcohols of from 1 to 6 carbon atoms such as methanol, ethanol, propanol, butanol, etc.; polyols such as glycol, ethylene glycol, etc.; ketones such as acetone, methyl ethyl ketone, etc.; aromatic solvents such as cresol, toluol; and other solvents such as N-substituted pyrrolidone such as N-methylpyrrolidone, N-cyclohexylpyrrolidone, N-butylpyrrolidone, dimethylacetanilide, dimethylformamide, high boiling petroleum hydrocarbons and mixtures thereof. Mixture of water with certain liquids such as acetone and ethyl alcohol may be used where the solubility of the particular monomers permit.

The tetracarboxylic component and a polyamine component of the A-staged composition are capable of condensation polymerization. When this system has a volatile content within the critical limits described above, the tetracarboxylic component and polyamine component will polymerize and foam contemporaneously upon being heated to a critical temperature which varies with the particular reactant system used as well as with the volatile content of that system.

The expressions "to foam" and/or "foaming" are used to indicate that the system undergoes cell formation and a decrease in density which may or may not be accompanied by an increase in volume.

The percent volatile content of both the A-staged and B-staged systems is measured by the weight loss occurring in a 1 to 5 gram sample of the system which is heated at 300° C. for 10 minutes. This value is calculated as follows:

$$\frac{\text{Original sample weight} - \text{weight of sample after heating}}{\text{Original sample weight}} \times 100\% = \text{percent volatiles}$$

The percent volatiles in the A-staged systems is due primarily to any solvent used to dissolve the monomeric reactants and to the evolution of the alcohol moiety of the ester or the ammonia moiety of the salt and water evolved during the condensation polymerization which occurs upon heating. As is readily apparent to those skilled in the art, the volatile content of the system, due solely to the evolution of the alcohol moiety of the ester or the ammonia moiety of the salt and to water of condensation, will decrease as polymerization occurs. Once the volatile content of the system, which is due to this evolution of alcohol or ammonia and water of condensation, falls below the critical percent volatile content, which critical limit varies from system to system, no foaming will take place regardless of the temperature at which the system is heated.

The B-staged resin used in the practice of the present invention is a polyimide composition which is characterized by having a plurality of recurring imide linkages formed from a tetracarboxylic component and a polyamine having at least two primary amino groups per molecule. Other groups derived from the tetracarboxylic component and/or polyamine component may also be present in the B-staged composition such as amide groups, and salt groups formed from ammonia and ammonium derivatives or from metals, etc.

The tetracarboxylic components used to prepare the B-staged resin are well known to those skilled in the art and include the tetracarboxylic acid dianhydrides set forth above and derivatives of these dianhydrides such as the corresponding free acids, ester derivatives, ammonium salts, substituted ammonium salts, metal salts, acid halides, etc.

The polyamine component used to prepare the B-staged resin are well known to those skilled in the art and include those polyamines listed above.

The volatile content of the B-staged resin should be less than 9% by weight and more preferably less than 5% by weight.

The bulk density of the B-staged material may vary over a wide range and contributes significantly to the bulk density of the resulting foam. For purposes of this invention low density B-staged material is considered to have a bulk density of less than 10.0 lbs./cu. ft. whereas high density B-staged material has a minimum bulk density of 10.0 lbs./cu. ft.

The low density B-staged material is conveniently prepared by heating the A-staged material so as to provide a foam with a bulk density of less than 10.0 lbs./cu. ft. and then grinding this material into a particulate state as is described in more detail below. The high density B-staged material is conveniently prepared by conventional polymerization techniques. This material may be prepared in particulate form directly by first preparing a polyamide acid solution and then converting the polymer into a polyamide by heating this solution to temperatures above 50° C. while maintaining agitation. Further details of this process are outlined in U.S. Pat. 3,429,588.

Alternately, one may prepare a particulate high density B-staged resin by heating an intimate mixture of a tetracarboxylic dianhydride derivative and a polyamine according to the following schedule:

16 hours at 100° C.
2 hours at 200° C.
2 hours at 250° C.
5 hours at 300° C.

In another method a polyamide resin in a non-particulate form is reduced to particulate form by grinding and then sieving the particles.

The preferred low density B-staged material has a particle size of less than two (2) mesh while the high density B-staged material has a particle size of less than ten (10) mesh and more preferably less than 20 mesh as determined with a U.S. Standard Sieve.

The high density polyimide foams of the present invention are obtained by preparing an intimate mixture of (1) an A-staged polyimide forming system having a volatile content of at least 9% by weight and (2) a B-staged polyamide system having a volatile content of less than 9% by weight and then heating this mixture to at least that minimum critical temperature where foaming of the A-staged material occurs contemporaneously with the polymerization of that material.

The ratio of A-staged to B-staged material varies from 5 to 95 weight percent to 95 to 5 weight percent based on the total resin weight of the system. More preferably, the ratio of A-staged to B-staged material is from 40 to 60 weight percent to 80 to 20 weight percent based on the total resin weight of the system. The total resin weight of the system includes both the polymer forming A-staged material and the polymeric B-staged material.

Generally speaking the A-staged resin when foamed alone will provide polyimide foams with a density of less than 10 lbs./cu. ft. In order to prepare polyimide foams having densities from about 10 lbs./cu. ft. to about 25 lbs./cu. ft. and to prepare foams having densities of from 4 to less than 10 lbs./cu. ft. having improved physical properties, a certain critical amount of B-staged material of given density must be present. In order to prepare foams having densities of greater than about 25 lbs./cu. ft., the mixture of the A-staged or B-staged compositions must be compressed either before or after foaming as will be discussed in more detail below.

The intimate mixture of A-staged and B-staged materials can be prepared according to any of several methods which will become apparent to those skilled in the art. In one method the B-staged materials is slurried in a solution of the A-staged material. This material is then foamed directly or alternately, the solvent is removed using temperatures which are preferablby below 100° C. with or without reduced pressures. The resulting dry powder is then ground and screened, if necessary. In another method dry intimate mixtures of the A-staged and B-staged materials are dry blended to a uniform mixture. In still another method the respective materials are ground in the presence of each other using the technique discussed above in regard to the preparation of the components of the A-staged composition. The intimate mixture of the A-staged and B-staged materials is then heated to its minimum critical temperature to form the polyimide foams.

The minimum critical temperature necessary to cause foam formation is defined as that temperature at which the polymerization and the foaming of the A-staged material occur contemporaneously. Although these two reactions usually proceed together, it is not necessary that they start together or end together or even be of the same duration in time. This minimum critical temperature may be further defined as that temperature a which the A-staged tetracarboxylic component and the polyamine component, or salts formed from these reactants, will polymerize while contemporaneously foaming, to give a product that is polymer foam. This concept is radically different from the usual method of first polymerizing a polyamine solution and then introducing bubbles into the solution and then converting the polyamide acid to a polyimide as is described in the prior art.

The temperatures necessary to produce the polyimide foams of this invention will depend upon the particular reactants used as well as upon such factors as carrying out the reaction under atmospheric, super-atmospheric or sub-atmospheric conditions as well as upon the use of catalysts, blowing agents, surface active agents, nucleating agents, etc., as are discussed below. In general, the co-reactants in the A-staged composition must be heated to at least their minimum critical temperatures in order to polymerize the reactants while contemporaneously forming the foam. The heating time will likewise vary with the reactants as well as with the above mentioned conditions. In general, the polyimide forming A-tsaged material will form a polyimide structure more rapidly at elevated temperatures, i.e., temperatures about one hundred degrees centigrade (100° C.) or more above the minimum critical temperature of the system.

Conversely, the selection of temperature conditions which is at or slightly above the reaction temperature of the A-staged carboxylic components/polyamine components or salts formed from these components will require a longer heating time in order to form the polyimide polymer structure. It should be noted in regard to the case of using temperatures at or slightly above the minimum critical temperature of the system, that the foaming of the mass will usually occur at the start of the polymerization reaction, but will end prior to the completion of the polyimide polymer structure.

The use of temperatures which are at least 25° C. above the polymerization reaction temperature of the A-staged material is to be preferred. Especially preferred is the use of temperatures which are at least 50° C. above the polymerization reaction temperature of the A-staged material. Most especially preferred is the use of temperatures which are at least 100° C. above the polymerization reaction temperature of the A-staged materials. When using the preferred dialkyl esters of tetracarboxylic acids and the preferred diamines as the A-staged components under atmospheric conditions and without additives for the facilitation of foam formation, temperatures of at least 250° C. are preferred.

In determining a specific volatile content and a specific temperature necessary for preparing foams in the practice of this invention several factors must be considered. The minimum permissible percent volatile content and critical temperature will depend on the particular A-staged tetracarboxylic and polyamine componens chosen, the particular solvent system (in the event that a solvent based system is used instead of an intimate mixture of dry reactants) the type of foam desired, etc.

Inherent in the concept of this invention is heating the reactants until foam formation takes place, i.e. cell formation in the resin accompanied by a decrease in density with or without a corresponding increase in volume. The time required for foam formation to take place will vary with the systems. Generally, the foaming process will begin within 30 minutes after the minimum critical temperature is reached.

Once the polyimide foam is formed, it may be post-cured at temperatures up to 372° C. for as long as 24 hours with no substantial change in the properties of the foam.

The following examples are set forth in illustration of the present invention and should not be construed as a limitation thereof. Unless otherwise indicated, all parts and percentages given are by weight.

EXAMPLE 1

This example is set forth to illustrate the preparation of an A-staged polyimide forming composition having a volatile content of greater than 9%.

A solution of the diethyl ester of benzophenone tetracarboxylic acid (BTA-diEt) is prepared by refluxing a suspension of 468 parts of benzophenone tetracarboxylic acid dianhydride (BTDA) in 820 parts of 2B ethanol for 1 hour. The resulting solution of the diester is cooled to 50° C. and 156.4 parts of m-phenylene diamine (m-PDA) is added and the solution is stirred for ½ hour. This solution is placed in a round bottom flask attached to a Rinco Evaporator, and the solution is evaporated under water pump vacuum at 50° C. The A-staged product, which is a friable molecular dispersion of benzophenone tetracarboxylic acid-diethyl ester and m-phenylene diamine components, is easily removed from the flask as a brown powder, having a volatile content of 24%, which powder is free flowing below 100° C., cakes between 100 to 105° C. and melts at 105 to 115° C. to form a dark gummy liquid. This A-staged material is sieved through a 20 mesh U.S. Standard Sieve.

EXAMPLE 2

This example is set forth to illustrate the preparation of a B-staged polyimide forming composition having a volatile content of less than 9%.

Example 1 is repeated here and the powdered A-staged product is sprinkled in a shallow aluminum tray and B-staged in a preheated 300° C. oven for 10 minutes. A polymer foam having a bulk density of 0.6 lb./cu. ft. and a volatile content of less than 2% is obtained. This B-staged product is then ground and sieved through a 10 mesh U.S. Standard Sieve.

EXAMPLE 3

This example is set forth to illustrate the preparation of a polyimide foam having a density of 18 lbs./cu. ft.

376 parts of the A-staged material prepared in Example 1 is intimately blended with 143 parts of the B-staged material prepared in Example 2. The intimate mixture is then hand packed into a 4½" cube, covered with a vented lid and heated at 300° C. for 3 hours and 45 minutes. The resulting polyimide foam has a density of 18 lbs. per cu. ft.

EXAMPLE 4

This example is set forth to illustrate another variation which is used to obtain high density foam. Example 3 is repeated here except that the dry intimate mixture of A-staged and B-staged material is wet down with trichloroethylene in order to allow more material to be packed into the 4½" cube. 1,000 parts of this wet-down mixture is packed into the cube and the cube is then covered and heated for 18 hours at 200° C. and then for 2 hours at 300° C. The resulting foam has a density of 34.5 lbs. per cu. ft.

EXAMPLE 5

This example is set forth to illustrate the preparation of a polyimide foam having a bulk density of about 6.6 lbs./cu. ft. 296 parts of an A-staged resin prepared as in Example 1 having a volatile content of 24% is intimately blended with 75 parts of a B-staged resin prepared as in Example 2. The resulting mixture is sifted through a 20 mesh U.S. Standard Sieve, placed in a mold and heated at 250° C. for 4 hours. The resulting foam has a bulk density of about 6.6 lbs./cu. ft.

In the following Examples 6 and 7, Example 5 is repeated except that colloidal silica is added to the intimate mixture of the A-staged and B-staged materials in order to obtain an improved foam of higher density. Note that the colloidal silica has a low bulk density which alone does not account for the higher density obtained when this material is blended in with the resinous components.

EXAMPLE 6

Example 5 is repeated here except that 6 parts of colloidal silica having a bulk density of about 2.4 lbs./cu. ft. is blended in with the A-staged and B-staged resins. The resulting foam has a bulk density of about 9.0 lbs./cu. ft. The improved physical properties of this material are discussed below.

EXAMPLE 7

Example 6 is repeated here except that 15 parts of colloidal silica is blended in with the A-staged and B-staged resins. The resulting foam has a bulk density of about 13.5 lbs./cu. ft. The improved physical properties of this material are discussed below.

EXAMPLE 8 (CONTROL)

Example 7 is repeated here except that no B-staged material is used in order to illustrate the need for the presence of the B-staged material in order to obtain a high density foam and to further illustrate that the colloidal silica does not account for an increase in bulk density in the absence of the B-staged material.

296 parts of the A-staged resin used in Example 6 is intimately mixed with 15 parts of colloidal silica having a bulk density of about 2.4 lbs./cu. ft. The material is placed in a mold and heated at 250° C. for 4 hours. The resulting foam has a bulk density of 0.7 lb./cu. ft. In Table I below the compressive strength of this foam is compared to that foam obtained in Example 7.

EXAMPLE 9

This example is set forth to illustrate an alternate method of preparing an intimate mixture of an A-staged and B-staged resin, which is then used to prepare a high density foam.

100 parts of a B-staged resin of the type prepared in Example 2 having a volatile content of less than 2% is slurried in 500 parts of a 60% solids solution comprising equimolar amounts of the diethyl ester of benzophenone tetracarboxylic dianhydride and m-phenylene diamine.

The resulting paste is vaccum dried at 75° C. for 8 hours and then ground and sieved to less than 10 mesh through a U.S. Standard Sieve. The A-staged portion of the mixture is found to have a volatile content of about 25%. The powder is loosely packed into a mold and cured at 200° C. for 6 hours. The resulting foam has a density foam has a density of 24 lbs./cu. ft.

EXAMPLE 10

Example 9 is repeated here except that 800 parts of the 60% solids solution of the diester and diamine are used instead of the 500 parts used in Example 9. The resulting foam has a density orf 24 lbs./cu. ft.

EXAMPLE 11

This example is set forth to illustrate the preparation of a high density B-staged material. An equimolar solution mixture of the diethyl ester of benzophenone tetracarboxylic acid and m-phenylene diamine in N-methyl pyrrolidone is heated for 2 hours at 150° C. The polyimide particles which precipitate from solution are cured by heating at 300° C. for 4 hours. The particles, which are sieved through a 100 mesh U.S. Standard Sieve, have a volatile content of less than 1% and a bulk density of 25 lbs./cu. ft.

EXAMPLE 12

This example illustrates the use of a high density B-staged resin in the preparation of a high density polyimide foam. 530 parts of an A-staged polyimide forming resin of the type prepared in Example 1, 200 parts of low density B-staged resin of the type prepared in Example 2 and 400 parts of high density B-staged resin of the type prepared in Example 11 are intimately blended and poured into a mold. The mixture is heated for 16 hours at 300° C. to give a polyimide foam having a density of 17.5 lbs./cu. ft.

EXAMPLE 13

Example 12 is repeated here except that 100 parts of low density B-staged resin and 400 parts of high density B-staged resin are used. The resulting polyimide foam has a density of 26 lbs./cu. ft.

EXAMPLE 14

This example illustrates the use of hollow glass spheres as a filler for the high density foams of the present invention. 400 parts of hollow glass beads having diameters in the range of from 0.01 to 0.5 millimeter are intimately mixed with 670 parts of an A-staged resin of the type prepared in Example 1 and 100 parts of a low density B-staged resin of the type prepared in Example 2. This mixture is poured into a mold and heated at 300° C. for 16 hours. The resulting polyimide foam has a bulk density of 13.2 lbs./cu. ft.

The following examples, 15 and 16, illustrate the use of a major portion of the B-staged material to a minor proportion of the A-staged material.

EXAMPLE 15

900 parts of a B-staged resin of the type prepared in Example 2 is slurried into a 12.4% solids solution comprising equimolar amounts of the diethyl ester of benzophenone tetracarboxylic acid and m-phenylene diamine in ethanol. The weight ratio of A-staged solids to B-staged solids in the resulting slurry is 12.4 to 90. The volatile content of the A-staged material is approximately 87.6% whereas that of the B-staged material is less than 1%. The resulting paste is placed in a mold without any attempt to compress the material and heated at 300° C. for 3 hours. The resulting foam has a density of 4.2 lbs./cu. ft.

EXAMPLE 16

Example 15 is repeated here except that the equimolar solution of the diethyl ester of benzophenone tetracarboxylic dianhydride and m-phenylene diamine is diluted to 6.2% solids and 950 parts of B-staged resin are used in place of the 900 parts used in Example 15. The A-staged portion of the resulting paste has a volatile content of about 93.8% based on the total weight of reactants and solvent. The ratio of A-staged material to B-staged material is 6.2 to 95. The resulting paste is cured as in Example 15 to give a polyimide foam having a bulk density of 5.0 lbs./cu. ft.

EXAMPLE 17 (CONTROL)

This example is set forth to illustrate a polyimide foam having a density of 9.1 lbs./cu. ft. which is prepared without using any B-staged material. The A-staged material, which has a volatile content of 16%, is prepared according to the general procedure of Example 1. This material is cured for four hours at 250° C. to give a polyimide foam having a bulk density of 9.1 lb.s/cu. ft.

The foam samples prepared in the foregoing examples are tested for compressive strength using an Instron Tester, equipped with an F cell, using a cross head speed of ½" per minute and chart speed of 1" per minute. A 1-inch cube of foam is compressed to a maximum of 25% compression. At 5, 10 and 25% compression, the amount of stress on the foam is recorded and a stress strain curve is prepared for each sample. The stress values for the samples, which are reported in lbs./sq. in., are tabulated below in Table 1

TABLE I.—COMPRESSION TESTING OF FOAM SAMPLES

| Example: | Weight ratio A-staged B-staged [1] | Foam density [2] | Compression strength [3] | | |
|---|---|---|---|---|---|
| | | | 5% | 10% | 25% |
| 3 | 2/1 | 18 | 240 | 356 | 578 |
| 4 | 2/1 | 34.5 | 1,050 | 1,525 | 3,090 |
| 5 | 3/1 | 6.6 | 13 | 19 | 38 |
| 6 | 3/1 | 9.0 | 34 | 48 | 81 |
| 7 | 3/1 | 13.5 | 86 | 135 | 216 |
| 8 (control) | | 0.7 | 0.8 | 1.7 | 4.8 |
| 9 | 2.25/1 | 18.0 | 285 | 445 | 722 |
| 10 | 3.6/1 | 24 | 560 | 1,440 | 2,428 |
| 12 | 2/3 | 17.5 | 26 | 41 | 72 |
| 13 | 4/5 | 26.0 | 155 | 238 | 410 |
| 14 | 5/1 | 13.2 | 67 | 94 | 178 |
| 15 | 10/90 | 4.2 | 1 | 2 | 6 |
| 16 | 5/95 | 5.0 | 4 | 7 | 14 |
| 17 (control) | | 9.1 | 39 | (4) | (4) |

[1] Calculated on a 100% resin basis excluding volatiles.
[2] Lbs./cu. ft.
[3] Values given in lbs./sq. in. at 5, 10 and 25% compression.
[4] Foam failure.

The data in the foregoing table illustrates the range of compressive strengths that may be obtained in polyimide foams prepared according to the teachings of the present invention. The foam density and compressive strength can be varied to meet the requirements of the particular application for which the foam is used. In all cases except Example 17, the foam returns to its original shape and dimensions after removal of the compressive force. Note in Examples 5 through 7, that the addition of colloidal silica to the A-staged and B-staged mixture causes an unexpected increase in foam density and compressive strength. However, this unexpected increase does not occur in Example 8 which is prepared according to the teaching of the prior art using no B-staged material.

A comparison of Example 6, which is prepared in accordance with the practice of this invention and Example 17, which is prepared in accordance with the teaching of the prior art, illustrates the improved compressive strength and resiliency which is obtained in foams prepared in accordance with the teaching of the present invention.

The foams prepared in the examples listed in Table I are further tested for thermal stability and ablative properties by holding them in the flame of a Bunsen Burner. In all cases the polyimide foam would glow but would not burn.

The following examples are in further illustration of various embodiments which are possible within the scope of the present invention.

EXAMPLE 18

Example 16 is repeated here except that the paste is compressed to about two-thirds (⅔) of its original volume and maintained under this pressure during cure. The resulting foam has a bulk density greater than 12 lbs./cu. ft.

EXAMPLE 19

This example illustrates an alternate procedure for preparing a B-staged material for use in the preparation of high density polyimide foam.

A 60% solids solution of equimolar amounts of the diethyl ester of benzophenone tetracarboxylic acid and m-phenylene diamine is evaporated under vacuum at 85° C. to give an A-staged material having a volatile content of 24%.

One-half (½) of this material is heated further to yield a B-staged material with 3.8% volatiles. Both A-staged and B-staged materials are screened through a 20-mesh U.S. Standard Sieve and subsequently used in the preparation of high density polyimide foam.

EXAMPLE 20

This example illustrates the preparation of a polyimide foam having a density of 25.2 lbs./cu. ft. using the A-staged and B-staged materials prepared in Example 19.

885 parts of A-staged material and 725 parts of B-staged material are intimately mixed and compressed in a 2¾ inch cube and cured accordingly to the procedure of Example 3, to give a polyimide foam having a bulk density of 25.2 lbs./cu. ft.

EXAMPLE 21

This example illustrates the preparation of a polyimide foam having a density of 31.2 lbs./cu. ft. using the A-staged and B-staged materials prepared in Example 19.

The general procedure of Example 20 is repeated here except that the intimate mixture of A-staged and B-staged material is wet down with trichloroethylene to allow denser packing of the A-staged and B-staged materials. The resulting foam has a bulk density of 31.2 lbs./cu. ft.

EXAMPLE 22

This example is set forth to illustrate the preparation of a polyimide foam having a bulk density of 48.7 lbs./cu. ft. 260 parts of an A-staged resin having a volatile content of 31% which is prepared according to the procedures outlined in Example 1 is intimately mixed with 100 parts of a low density B-staged resin having a volatile content of less than 1% which is prepared according to the general procedures of Example 2 and 308 parts of a hgh density B-staged resin having a volatile content of less than 4% which is prepared according to the teachings of Example 11. This intimate mixture of A-shaged and B-staged material is further blended with 100 parts of colloidal silica and 270 parts trichloroethylene. The mixture is packed into a 2½″ cube and curred at 200° C. for 24 hours to give a polimide foam having a bulk density of 48.7 lbs./cu. ft.

EXAMPLE 23

This example is set forth as another illustration for the preparation of polyimide foam using an A-staged material having a volatile content of 18.9% which material is prepared according to the general procedure of Example 1. 400 parts of 18.9% volatile A-staged material is intimately blended with 100 parts of low density B-staged material prepared according to the general procedures of Example 2. This intimate mixture is packed into a 2½″ cube and heated for 2 hours at 300° C. The resulting polyimide foam has a bulk density of 17 lbs./cu. ft.

EXAMPLE 24

Example 23 is repeated except using 400 parts of the A-staged material and 50 parts of the B-staged material which is then poured loosely into place. The resulting foam has a bulk density of 12 lbs./cu. ft.

EXAMPLE 25

This example is set forth to illustrate the use of weight ratio of A-staged material to B-staged material of 85 to 15.

In this example 850 parts of A-staged material of the type used in Example 23 except with a volatile content of 27% is intimately mixed with 150 parts of B-staged material of the type prepared in Example 2. The mixture is heated for 2 hours at 300° C. to give a polyimide foam with a bulk density of 21 lbs./cu. ft.

EXAMPLES 26 TO 39

The following examples are set forth to illustrate other possible variations in A-staged materials which may be used in the practice of this invention. In each example equimolar amounts of a tetracarboxylic component and polyamine component are used to prepare the A-staged materials. The B-staged material used is a low density material prepared according to the general procedures of Example 2. The weight ratio of A-staged to B-staged material is 2 to 1 and the foams are prepared according to the general procedure outlined in Example 3. The resulting foams are comparable to that foam obtained in Example 3. The compositions of the A-staged materials are tabulated below in the following Table II.

TABLE II.—SUMMARY OF A-STAGED MATERIAL USED IN EXAMPLES 26 TO 39

| Example | Ester | Polyamine | Percent volatiles |
|---|---|---|---|
| 26 | Dimethyl ester of BTA | PAB | 9 |
| 27 | 1,4-diethyl ester of PMA | MDA | 25 |
| 28 | Tetraethyl ester of BTA | m-PDA | 32 |
| 29 | Dimethyl ester of BTA | MEM | 19 |
| 30 | 1-methyl ester of BTA | BIM | 17 |
| 31 | 1-ethyl ester of BTA | m-PDA | 20 |
| 32 | 1-butyl ester of BTA | PAB | 14 |
| 33 | Di-N,N-dimethyl ethanol amine ester of BTA. | m-PDA | 35 |
| 34 | Diethylene glycol ester of BTA | m-PDA | 29 |
| 35 | Diammonium salt-diamide of BTA. | m-PDA | 20 |
| 36 | Tetraammonium salt of BTA | m-PDA | 26 |
| 37 | Diethyl ester-diammonium salt of BTA. | m-PDA | 35 |
| 38 | Diethyl ester of BTA | ODA | 17 |
| 39 | do | p-PDA | 23 |

Legend:
BIM=bis(3-methyl-4,6-diaminophenyl)-methane.
BTA=benzophenone tetracarboxylic acid.
MDA=methylene dianiline.
MEM=3-methyl-4,6-4′-triaminodiphenylmethane.
ODA=4,4′-oxydianiline.
m-PDA=meta-phenylene diamine.
p-PDA=para-phenylene diamine.
PAB=para-phenylene-bis-2(5-amino-1,3-benzoxazole).
PMA=pyromellitic acid.

The polyimide foams of the present invention are especially valuable as thermal and electrical insulation and find wide application wherever high temperature resistance insulation is required. These foams may be used as the core structure in sandwich-type construction used in automotive, marine, aeronautical and space vehicles. They may also be used as insulation for electrical components and as thermal insulation in fire doors, over walls, refrigerators, freezers, garments, etc.

The high density substantially all resin foams of the present invention find special use in those certain applications which require high density polyimide foam which has uniform dielectric properties, uniform electrical dissipation, uniform high energy ionization radiation resistance, uniform thermal coefficient of expansion, etc.

These substantially all polyimide resin foams show an unexpected advantage over polyimide foams which contain inert fillers as is indicated in the following Examples 40 to 44.

EXAMPLES 40 TO 44

These examples are set forth to illustrate the superior compressive strength of a substantially all polyimide foam over a polyimide foam which is filled with hollow glass spheres after aging for 116 hours at 600° F.

In each example the A-staged (24% volatiles) and B-staged (less than 1% volatiles) material is prepared as in Example 1 and 2 respectively, and the foam is prepared according to the general procedures outlined above. The hollow glass spheres used are the same as those described in Example 14 while the colloidal silica used is the same as that described in Example 6. The compression testing is carried out according to the procedures described above.

The examples and test results are summarized in Table III below.

TABLE III.—SUMMARY OF EXAMPLES 40 TO 44

| | Parts by weight of materials [1] | | | | Foam density, lbs./cu.ft. | Compressive strength [2] | | | | | |
|---|---|---|---|---|---|---|---|---|---|---|---|
| | | | | | | Unaged | | | Aged 116 hrs. at 600° F. | | |
| | A-staged | B-staged | Spheres | Silica | | 5 | 10 | 25 | 5 | 10 | 25 |
| Example: | | | | | | | | | | | |
| 40 | 35 | 20 | 40 | 5 | 6.7 | 5 | 8 | 16.5 | 2.5 | 4 | 7 |
| 41 | 60 | 20 | 15 | 5 | 12.6 | | | 186 | 21 | 41 | 82 |
| 42 | 50 | 10 | 40 | | 13.2 | 67 | 94 | 178 | | | 79.5 |
| 43 | 80 | 20 | | | 16.0 | 200 | 286 | 495 | 158 | 228 | 359 |
| 44 | 75 | 25 | | | 7.7 | 30 | 42 | 75.5 | 23 | 36 | 63 |

[1] Parts by weight excluding percent volatiles.
[2] Values in lbs./sq. in. at 5%, 10% and 25% compression.

The compressive strength of the foams prepared in Examples 40 to 42, which foams contain glass spheres, falls off markedly after prolonged aging at 600° F. However, the polyimide foams of Examples 43 and 44, which are substantially all polyimide foams, retain most of their compressive strength even after prolonged aging.

The properties of the foams of this invention, e.g., density, texture, etc. may be altered by moistening the reactants with liquids such as alcohols, water, esters, ketones, aromatic solvents, aliphatic solvents, halogenated solvents, pyrrolidones, surfactants, antifoaming agents, etc. These materials are used merely to wet the A-staged and B-staged reactants and do not necessarily have to be solvents for the materials.

The foams of the present invention are characterized by a polyimide structure as evidenced by insolubility in cold basic reagents, such as N-methyl pyrrolidone, which are good solvents for the A-staged reactants. Infra-red absorption data on the foam structure also indicates a polyimide structure as indicated by the bands at 5.64, 5.89 and 13.85 microns. Foams prepared using benzophenone tetracarboxylic components as reactants are further characterized by a ketimine structure as is evidenced by I.R. absorption bands at 6.18 microns. Foams prepared from monomeric reactants characterized by having two benzoid structures joined by amide linkages will contain both imide and amide structures in the same polymeric foam.

If desired, the foams prepared in accordance with the practice of this invention may be post-cured at elevated temperatures e.g., 200–300° C. to insure the elimination of all volatiles and in some instances to toughen and preshrink the foam before its final end use.

The concept of this invention includes the use of tertiary amines such as pyridine, picoline, quinoline, etc., to accelerate the forming of the polyimide foam or allow foam formation to occur at lower temperatures. In general up to 10% of these reagents may be used. Vacuum methods, e.g., foaming at sub-atmospheric pressures are also contemplated as means to accelerate the foaming process or to allow foaming at lower temperatures.

While the reactants set forth in this invention are self-foaming and do not require external foaming means such as mechanical agitation, gas delivery tubes or blowing agents, such means may be useful in controlling cell size and shape and foam texture and density and are included in the concept of this invention. Also contemplated in the preparation of these polyimide foams is the use of nucleating agents, surface active agents, thermal stabilizer additives, fillers and fibrous reinforcing agents such as glass, asbestos, refrasil, quartz and boron fibers. Metallic fillers such as aluminum micro balloons are also useful in changing the physical properties of the polyimide foams. As illustrated in Examples 5 through 8 above, colloidal silica is especially useful in foam preparation.

The polyimide foams may be prepared in trays, vented containers or molds, and other suitable containers with or without external pressure on the A-staged and B-staged reactants, as is illustrated in the working examples. The foams may be formed around reinforcing members by dipping a reinforcing member into a solution or into dry intimate mixtures of the A-staged and B-staged reactants and then heating the systems to form a polyimide foam around the reinforcing member. Fluidized bed techniques may be used with hot reinforcing members being dipped into the monomeric reactants. However, these methods should not be construed as limiting. The scope of this invention also contemplates the use of flame-spray foaming techniques as well as the use of commercial foaming equipment such as extruders, injection foam molding machines, etc., as are well known to those skilled in the foaming art.

The polyimide foams of the present invention may be in bulk form or in the form of cellular polyimide sheets of varying thicknesses or shaped cellular polyimide objects.

In view of the foregoing it will become apparent that many modifications and variations may be made in the present invention without departing from the spirit and scope thereof.

What is claimed is:
1. A composition of matter comprising an intimate mixture of
  (A) from 5 to 95 parts by weight based on the total resin weight of the system of an A-staged polyimide resin forming composition having a volatile content of at least 9% by weight, and
  (B) from 95 to 5 parts by weight based on the total resin weight of the system of a B-staged polyimide resin having a volatile content of less than 9% by weight,
wherein the A-staged polyimide forming composition comprises a tetracarboxylic component selected from the group consisting of esters and ammonium salts of aromatic tetracarboxylic acids and mixtures thereof and a polyamine component containing at least two primary amino groups per molecule; wherein the B-staged polyimide resin is prepared from a tetracarboxylic component and a polyamine component and which is characterized by a plurality of recurring imide linkages.

2. The composition of claim 1 wherein the A-staged polyimide forming composition is an intimate mixture of an alkyl diester of benzophenone tetracarboxylic acid and an aromatic diamine.

3. The composition of claim 2 wherein the A-staged polyimide forming composition has a volatile content of at least 18%.

4. The composition of claim 1 wherein the weight ratio of A-staged material to B-staged material is in the range of from 40 to 60 weght percent to 80 to 20 weight percent.

5. The composition of claim 1 wherein the B-staged material is the reaction product of a benzopheone tetracarboxylic component and an aromatic diamine.

6. A composition of matter comprising an intimate mixture of
(A) from 5 to 95 parts by weight based on the total resin weight of the system of an A-staged polyimide resin forming composition having a volatile content of at least 18% by weight which composition is an intimate mixture of a diester of benzophenone tetracarboxylic acid and an aromatic diprimary amine containing at least two primary amino groups per molecule, and
(B) from 95 to 5 parts by weight based on the total resin weight of the system of a B-staged polyimide resin having a volatile content of less than 9% by weight which is the reaction product of an aromatic tetracarboxylic component and an aromatic diamine.

7. The composition of claim 6 wherein the diester of benzophenone tetracarboxylic acid is an alkyl diester.

8. The composition of claim 7 wherein the alkyl diester is the diethyl ester.

9. The composition of claim 7 wherein the aromatic diprimary amine is selected from the group consisting of phenylene diamine, methylene diamine and 4,4-oxydianiline.

10. A process for the preparation of a polyimide foam which comprises
(1) forming an intimate mixture of
(A) from 5 to 95 parts by weight based on total resin weight of the system of an A-staged polyimide resin forming composition having a volatile content of at least 9% by weight, and
(B) from 95 to 5 parts by weight based on the total resin weight of the system of a B-staged polyimide resin having a volatile content of less than 9% by weight,
wherein the A-staged polyimide forming composition comprises a tetracarboxylic component selected from the group consisting of esters and ammonium salts of aromatic tetracarboxylic acids and mixtures thereof and a polyamine component containing at least two primary amino groups per molecule; wherein the B-staged polyimide resin is prepared from a tetracarboxylic component and a polyamine component and which is characterized by a plurality of recurring imide linkages,
(2) heating the foregoing mixture at a temperature of at least 200° C.

11. The porcess of claim 10 wherein the mixture is heated at a temperature of at least 250° C.

12. The process of claim 10 wherein the A-staged polyimide forming composition is an intimate mixture of an alkyl diester of benzophenone tetracarboxylic acid and an aromatic diamine and wherein the heating is carried out at temperatures of at least 250° C.

13. The process of claim 11 which further includes the step of compressing the intimate mixture prior to heating.

14. A composition of matter comprising an intimate mixture of
(A) from 80 to 20 parts by weight based on the total resin weight of the system of an A-staged polimide resin forming composition having a volatile content of at least 18% by weight, and
(B) from 20 to 80 parts by weight based on the total resin weight of the system of a B-staged polyimide resin having a volatile content of less than 5% by weight,
wherein the A-staged polyimide forming composition comprises an intimate mixture of (1) a diethyl ester of benzophenone tetracarboxylic acid and (2) an aromatic primary diamine selected from the group consisting of meta-phenylene diamine, para-phenylene diamine, methylene dianiline and 4,4'-oxydianiline; and wherein the B-staged polyimide resin is a polyimide resin in particulate form which is the reaction product of a benzophenone tetracarboxylic component and an aromatic primary diamine selected from the group consisting of meta-phenylene diamine, para-phenylene diamine, methylene dianiline and 4,4'-oxydianiline.

15. A composition of matter as in claim 14 wherein the B-staged polyimide resin has a density of less than 10 lbs./cu. ft. and is the reaction product of a diethyl ester of benzophenone tetracarboxylic acid and meta-phenylene diamine.

16. A composition of matter as in claim 15 wherein the B-staged material has a particle size of less than two mesh.

17. A composition of matter as in claim 14 wherein the B-staged polyimide resin has a density of greater than 10 lbs./cu. ft. and is the reaction product of a benzophenone tetracarboxylic component and meta-phenylene diamine.

18. A composition of matter as in claim 17 wherein the B-staged material has a particle size of less than 10 mesh.

19. A composition of matter as in claim 14 wherein the A-staged polyimide resin forming composition is dissolved in a solvent and the B-staged material is slurried in the solvent.

20. A composition of matter comprising an organic solvent solution of from 80 to 20 parts by weight of an A-staged polyimide resin forming composition having a volatile content of at least 18% by weight, said solution having dispersed therein from 20 to 80 parts by weight of a B-staged polyimide resin having a volatile content of less than 5% by weight; wherein the parts by weight of the A-staged and B-staged components are based on the total resin weight of the system; wherein the A-staged polyimide forming composition comprises (1) a diethyl ester of benzophenone tetracarboxylic acid and (2) an aromatic primary diamine selected from the group consisting of meta-phenylene diamine, para-phenylene diamine, methylene dianiline and 4,4'-oxydianiline; and wherein the B-staged polyimide resin is a polyimide resin in particulate form which is the reaction product of a benzophenone tetracarboxylic component and an aromatic primary diamine selected from the group consisting of meta-phenylene diamine, para-phenylene diamine, methylene dianiline and 4,4'-oxydianiline; wherein the organic solvent is selected from the group consisting of ethanol, N-methylpyrrolidone, dimethylacetamide, dimethylformamide and mixtures thereof.

21. A process for the preparation of a polyimide foam which comprises:
(1) forming an intimate mixture of
(A) from 80 to 20 parts by weight based on the total resin weight of the system of an A-staged polyimide resin forming composition having a volatile content of at least 18% by weight, and
(B) from 20 to 80 parts by weight based on the total resin weight of the system of a B-staged polyimide resin having a volatile content of less than 5% by weight,
wherein the A-staged polyimide forming composition comprises an intimate mixture of (1) a diethyl ester of benzophenone tetracarboxylic acid and (2) an aromatic primary diamine selected from the group consisting of meta-phenylene diamine, para-phenylene diamine, methylene dianiline and 4,4'-oxydianiline; and wherein the B-staged polyimide resin is a polyimide resin in particulate form which is the reaction product of a benzophenone tetracarboxylic component and an aromatic primary diamine selected from the group consisting of meta-phenylene diamine, para-phenylene diamine, methylene dianiline and 4,4'-oxydianiline.

(2) heating the foregoing mixture at a temperature of at least 200° C.

References Cited
UNITED STATES PATENTS

| | | | |
|---|---|---|---|
| 3,249,561 | 5/1966 | Hendrix | 260—2.5N |
| 3,287,311 | 11/1966 | Edwards | 260—2.5N |
| 3,310,506 | 3/1967 | Amborski et al. | 260—2.5N |

SAMUEL H. BLECH, Primary Examiner

M. FOELAK, Assistant Examiner

U.S. Cl. X.R.

260—30.4, 32.4, 32.6, 32.8, 33.4, 47, 65, 78, 857

PO-1050
(5/69)

UNITED STATES PATENT OFFICE
CERTIFICATE OF CORRECTION

Patent No. 3,554,935     Dated January 12, 1971

Inventor(s) Edmund C. Knapp, Albert H. Markhart & Irving Serlin

It is certified that error appears in the above-identified patent and that said Letters Patent are hereby corrected as shown below:

Column 7, line 66, "ploamine" should read --- polyamine ---.
Column 8, line 4, delete "tanilide" and insert --- tamide, acetanilide
Column 9, line 24, "polyamide" should read --- polyimide ---.
Column 9, line 36, "polyamide" should read --- polyimide ---.
Column 10, line 32, "tsaged" should read --- staged ---.
Column 10, line 66, "componens" should read --- components ---.
Column 12, line 57, delete "24 lbs/cu.ft. and insert --- about 18 lbs/c ---.

Signed and sealed this 6th day of July 1971.

(SEAL)
Attest:

EDWARD M. FLETCHER, JR.
Attesting Officer

WILLIAM E. SCHUYLER, J
Commissioner of Patent